US012664675B2

(12) United States Patent
Zhu et al.

(10) Patent No.: US 12,664,675 B2
(45) Date of Patent: Jun. 23, 2026

(54) METHOD AND SYSTEM FOR OBTAINING HUMAN BODY SIZE INFORMATION FROM IMAGE DATA

(71) Applicant: AIStetic Limited, Abingdon (GB)

(72) Inventors: Dizhong Zhu, Oxford (GB); William Smith, Oxford (GB); Duncan Mckay, Oxford (GB); Philip Torr, Oxford (GB); Mohammadreza Babaee, Oxford (GB); Qizhu Li, Oxford (GB)

(73) Assignee: AIStetic Limited, Abingdon (GB)

( * ) Notice: Subject to any disclaimer, the term of this patent is extended or adjusted under 35 U.S.C. 154(b) by 366 days.

(21) Appl. No.: 18/573,871

(22) PCT Filed: Apr. 26, 2022

(86) PCT No.: PCT/GB2022/051058
§ 371 (c)(1),
(2) Date: Dec. 22, 2023

(87) PCT Pub. No.: WO2022/269219
PCT Pub. Date: Dec. 29, 2022

(65) Prior Publication Data
US 2024/0296579 A1    Sep. 5, 2024

(30) Foreign Application Priority Data
Jun. 24, 2021    (GB) ...................................... 2109126

(51) Int. Cl.
*G06T 7/62* (2017.01)
*G06T 7/11* (2017.01)
*G06T 7/73* (2017.01)

(52) U.S. Cl.
CPC .................. *G06T 7/62* (2017.01); *G06T 7/11* (2017.01); *G06T 7/74* (2017.01); *G06T 7/75* (2017.01);
(Continued)

(58) Field of Classification Search
None
See application file for complete search history.

(56) References Cited

U.S. PATENT DOCUMENTS

| | | | |
|---|---|---|---|
| 2019/0172114 A1 | 6/2019 | Penn et al. | |
| 2020/0126295 A1* | 4/2020 | Mok ...................... | G06V 20/64 |

(Continued)

FOREIGN PATENT DOCUMENTS

| | | |
|---|---|---|
| CN | 110717938 A | 1/2020 |
| WO | 2014/037939 A1 | 3/2014 |
| WO | 2020/141751 A1 | 7/2020 |

OTHER PUBLICATIONS

Combined Search and Examination Report for British Application No. 2109126.9 dated Apr. 8, 2022.
(Continued)

*Primary Examiner* — Leon Flores
(74) *Attorney, Agent, or Firm* — Wolf, Greenfield & Sacks, P.C.

(57) ABSTRACT

A computer implemented method of obtaining measurements of a person is disclosed herein. The method comprises obtaining a parametric deformable three-dimensional body model that can approximate the shape of any person, obtaining at least one image of the person, estimating one or more correspondences between the at least one image and the three-dimensional model, performing semantic image segmentation to segment the image of the person into their corresponding body parts, and iteratively adjusting at least one of (a) body pose and (b) shape parameters of the parametric deformable three-dimensional body model, to improve the fit of the three-dimensional model to at least one of: (i) the at least one image, (ii) the estimated one or more correspondences, and (iii) the segmented body parts. Measurements may then be extracted from the iteratively
(Continued)

adjusted parametric deformable three-dimensional body model.

16 Claims, 12 Drawing Sheets

(52) U.S. Cl.
CPC .............. *G06T 2207/20084* (2013.01); *G06T 2207/30196* (2013.01)

(56) References Cited

U.S. PATENT DOCUMENTS

| | | | | |
|---|---|---|---|---|
| 2020/0302621 | A1 | 9/2020 | Kong et al. | |
| 2021/0375045 | A1* | 12/2021 | Cao | G06T 19/20 |
| 2022/0188897 | A1* | 6/2022 | Szeli | G06T 7/70 |
| 2022/0222895 | A1* | 7/2022 | Li | G06T 17/20 |

OTHER PUBLICATIONS

International Search Report and Written Opinion for International Application No. PCT/GB2022/051058 mailed Aug. 4, 2022.

Alldieck et al., Video Based Reconstruction of 3D People Models. arXiv:1803.04758v3. Apr. 16, 2018. 11 pages.

Pavlakos et al., Texturepose: Supervising human mesh estimation with texture consistency. Proceedings of the IEEE/CVF International Conference on Computer Vision. 2019:803-12.

Wang et al., EllipBody: A Light-weight and Part-based Representation for Human Pose and Shape Recovery. arXiv:2003.10873v1. Mar. 24, 2020. 10 pages.

Zanfir et al., Monocular 3d pose and shape estimation of multiple people in natural scenes—the importance of multiple scene constraints. Proceedings of the IEEE Conference on Computer Vision and Pattern Recognition. 2018:2148-57.

Amberg et al., Reconstructing High Quality Face-Surfaces using Model Based Stereo. IEEE 11th International Conference on Computer Vision. 2007. 8 pages.

Bogo et al., Keep it SMPL: Automatic Estimation of 3D Human Pose and Shape from a Single Image. arXiv preprint arXiv:1607.08128. Jul. 27, 2016. 18 pages.

Cao et al., OpenPose: Realtime Multi-Person 2D Pose Estimation using Part Affinity Fields. arXiv preprint arXiv:1812.08008. May 30, 2019. 14 pages.

Gong et al., Look into person: Self-supervised structure-sensitive learning and a new benchmark for human parsing. Proceedings of the IEEE conference on computer vision and pattern recognition. Computer Vision Foundation. 2017:932-40.

Güler et al., Dense human pose estimation in the wild. Proceedings of the IEEE conference on computer vision and pattern recognition. Computer Vision Foundation. 2018:7297-306.

Johnson et al., Perceptual losses for real-time style transfer and super-resolution. Computer Vision—ECCV 2016: 14th European Conference, Amsterdam, The Netherlands, Oct. 11-14, 2016, Proceedings, Part II. 2016:694-711.

Kukelova et al., Closed-form solutions to the minimal absolute pose problems with known vertical direction. 2010. 14 pages.

Lepetit et al., EPnP: An Accurate O(n) Solution to the PnP Problem. Int J Comput Vis. Springer Science + Business. 2008. 12 pages.

Liu et al., Soft rasterizer: A differentiable renderer for image-based 3d reasoning. Proceedings of the IEEE/CVF international conference on computer vision. Computer Vision Foundation. 2019:7708-17.

Loper et al., SMPL: A Skinned Multi-Person Linear Model. Acm Transactions on Graphics. 2015;34(Article 248). 16 pages.

Pavlakos et al., Expressive body capture: 3d hands, face, and body from a single image. Proceedings of the IEEE/CVF conference on computer vision and pattern recognition 2019:10975-85.

Wang et al., Adaptive wing loss for robust face alignment via heatmap regression. Proceedings of the IEEE/CVF international conference on computer vision. Computer Vision Foundation. 2019:6971-81.

* cited by examiner

Obtaining a parametric deformable three-dimensional body model that can approximate the shape of any person (1010)

Obtaining at least one image of the person (1020)

Estimating one or more correspondences between the at least one image and the three-dimensional model (1030)

Performing semantic image segmentation to segment the image of the person into their corresponding body parts (1040)

Iteratively adjusting at least one of (a) body pose and (b) shape parameters   of the parametric deformable three-dimensional body model, to improve the fit of the three-dimensional model to at least one of: (i) the at least one image, (ii) the estimated one or more correspondences; and (iii) the segmented body parts; (1050)

Extracting measurements from the iteratively adjusted parametric deformable three-dimensional body model (1060)

Figure 9

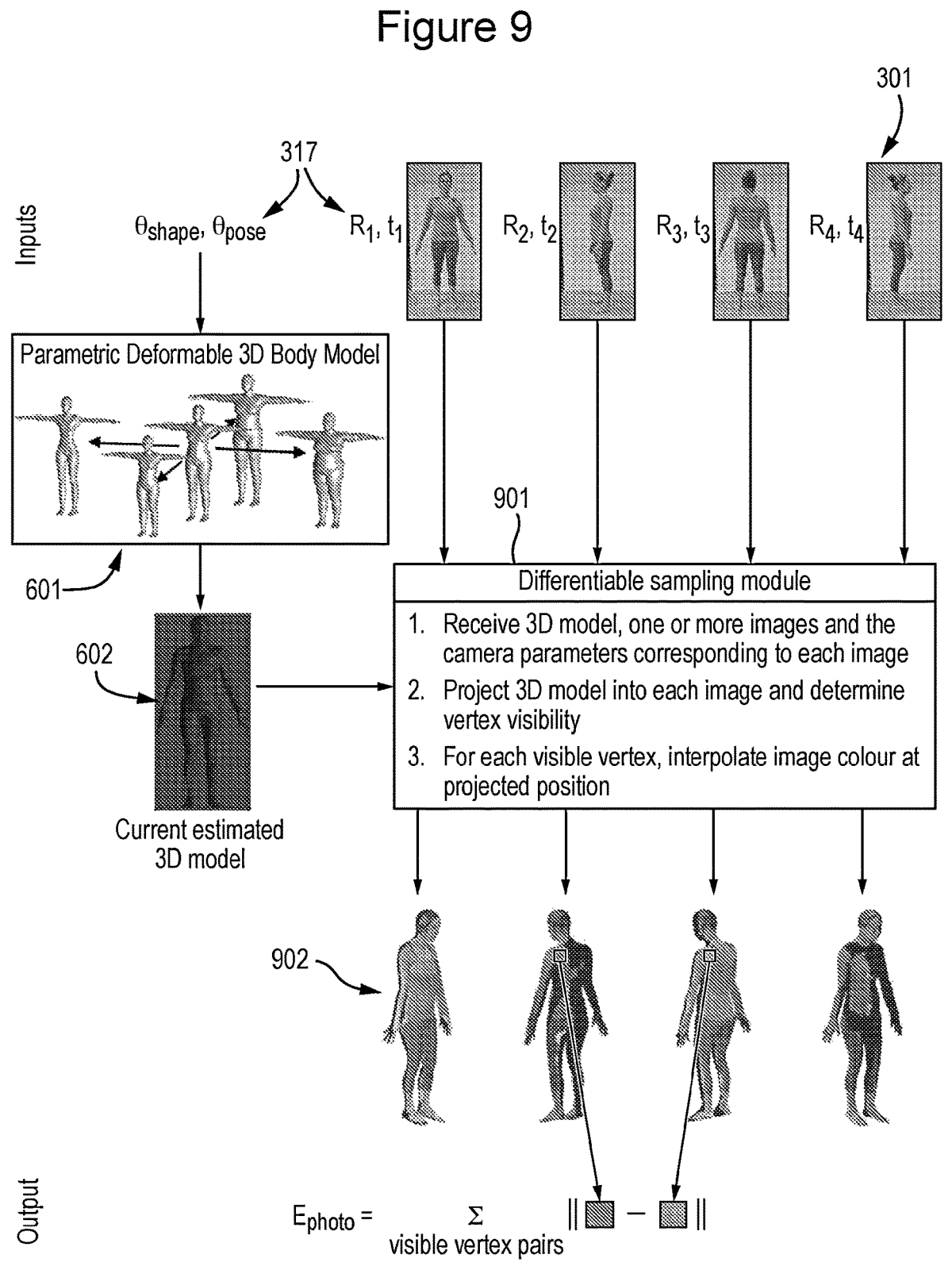

Inputs

317

$\theta_{shape}, \theta_{pose}$ $R_1, t_1$ $R_2, t_2$ $R_3, t_3$ $R_4, t_4$

301

Parametric Deformable 3D Body Model

601

602

Current estimated 3D model

901

Differentiable sampling module

1. Receive 3D model, one or more images and the camera parameters corresponding to each image
2. Project 3D model into each image and determine vertex visibility
3. For each visible vertex, interpolate image colour at projected position

902

Output $E_{photo} = \sum\limits_{\text{visible vertex pairs}} \| \blacksquare - \blacksquare \|$

Figure 10

METHOD AND SYSTEM FOR OBTAINING HUMAN BODY SIZE INFORMATION FROM IMAGE DATA

RELATED APPLICATIONS

This Application is a National Stage filing under 35 U.S.C. 371 of International Patent Application Serial No. PCT/GB2022/051058, filed Apr. 26, 2022, which claims the benefit of GB Application No. 2109126.9, filed Jun. 24, 2021, each of which is incorporated by reference in its entirety.

FIELD OF THE INVENTION

The present disclosure relates to a method and system for obtaining human body size information from image data.

BACKGROUND

Online shopping has increased dramatically in recent years, and this trend has accelerated recently with the pandemic situation in 2020-2021 due to Covid-19. A problem with buying clothes online is that a shopper cannot try on an item of clothing before it is purchased, as may be the case with traditional bricks-and-mortar shops. As a result, clothes are frequently returned (47% and 25% return rates have been reported from Barclaycard™ Research 2018 and Financial Times™ 2016 respectively).

This high return rate for items of clothing has an environmental cost—not only in terms of the carbon footprint in terms of increased deliveries and additional logistics required, but also a large proportion of the items go to landfill. The high return rate also has a cost for retailers as they have to process the return, re-stock and re-deliver. Buying clothes online is also a burden for consumers, with many typically opting to order multiple sizes, having to send these back or to make a special trip to a store or post office.

SUMMARY OF THE INVENTION

Aspects of the invention are as set out in the independent claims and optional features are set out in the dependent claims. Aspects of the invention may be provided in conjunction with each other and features of one aspect may be applied to other aspects.

Disclosed herein is a method and learning system for generating an accurate reconstruction and measurement of individuals from RGB images, for example captured on a smartphone. The system generates accurate reconstructions through, for example, semantic image segmentation and 2D joint location estimation with trained neural networks and 3D shape and pose parameter estimation of a parametric model using photo-consistency, segmentation and correspondence cues. Accurate human body size information (i.e. measurements) may then be taken of the individual, for example to provide a virtual tailor measurement service.

While other solutions to obtaining measurement data of individuals from images may exist (as discussed briefly below), these typically tend to focus on machine learning data-driven predictive solutions. By contrast, embodiments of the disclosure employ a unique computer vision and deep learning based technological approach that use deep learning for image preprocessing to derive useful intermediate representations & computer vision to deliver a highly accurate, autocalibrated measurements derived from those representations. The deep learning algorithms provide a high level of robustness and may maintain this accuracy despite challenging image capture situations including—low light and variation in image quality.

An example of a conventional technique includes US2019172114 which describes methods for making garments, for example by capturing images of a subject and making garments for that subject without requiring the subject to visit a tailor for conventional measurement with a tape measure. This document does not disclose, however, how the three-dimensional modelling is performed or how measurements of the user are obtained.

Another example conventional technique is described in US2020302621 which describes a method for three-dimensional human pose estimation, which can realize the real-time and high-precision 3D human pose estimation without high configuration hardware support and precise human body model. This method for three-dimensional human pose estimation, includes the following steps: (1) establishing a three-dimensional human body model matching the object, which is a cloud point human body model of visible spherical distribution constraint, (2) Matching and optimizing between human body model for human body pose tracking and depth point cloud, (3) Recovering for pose tracking error based on dynamic database retrieval. This model, however, uses point cloud information and relates primarily to pose estimation rather than the ability to obtain any measurement data from a user.

EP2893479 describes a method for deriving accurate body size measures of a user from a sequence of 2D images, comprising the steps of: a) scanning the body of said user by obtaining a sequence of raw 2D images of said user as captured by a camera; b) analysing the behaviour of said user by tracking the position, pose/rotation and posture of said user before and during the scanning, by using a user behaviour analyser (UBA); c) extracting and encoding 2D shape data descriptors from said sequence of images by using a 2D shape analyser (2DSA); and d) receiving said 2D shape descriptors as well as the user's position, pose and rotation data and integrating them into a 3D shape model, wherein said integration includes assigning rotation values to said sequence of images, wherein said values are either absolute values with respect to a full frontal position or relative, with respect to a reference image in said sequence.

WO2020141751 describes a method for obtaining a picture for measuring a body size and a body size measurement method using same, wherein, by providing a guiding line through a capturing screen of a terminal, an optimal image for measuring a body size is obtained, and the edge of a user body is extracted from the obtained image and used to obtain a 3D image of the user body, and thus an accurate body size of a user may be calculated. While this document appears to describe creating and correcting a three-dimensional body image model, the document does not describe how the correction is done.

CN110717938 describes a method and system for remotely obtaining human body size information based on video analysis and belongs to the technical field of modelling measurement. A remote system is constructed, a three-dimensional coordinate system is established, a plurality of reference objects are selected, and the reference objects are selected as articles with the same size; calculating the position of the foot of the client in a camera coordinate system according to the position of the foot of the client, and mapping the position and information such as height into an actual three-dimensional coordinate system; calculating the size of the human body according to the pixel proportion of the human body in the video; for each frame, finding a central point; for waist measurement, firstly finding a central point of a waist trunk; measuring the widest marginal point of the waist 2D image; performing 3D modelling according to all the marginal points of one week; repeated collection is performed, the precision is improved, human body segmentation in the video is performed, different parts are independently modelled for video analysis, and the size for body measurement clipping is obtained.

In a first aspect of the disclosure there is provided a computer implemented method of obtaining measurements of a person. The method comprises obtaining a parametric deformable three-dimensional body model that can approximate the shape of any person, obtaining at least one image of the person, estimating one or more correspondences between the at least one image and the three-dimensional model, performing semantic image segmentation to segment the image of the person into their corresponding body parts, and iteratively adjusting at least one of (a) body pose and (b) shape parameters of the parametric deformable three-dimensional body model, to improve the fit of the three-dimensional model to at least one of: (i) the at least one image, (ii) the estimated one or more correspondences, and (iii) the segmented body parts. Measurements may then be extracted from the iteratively adjusted parametric deformable three-dimensional body model.

Estimating one or more correspondences between the at least one image and the three-dimensional model may comprise obtaining a correspondence between a two-dimensional location in the image and an index to either (i) a point on the surface or (ii) an internal joint of the three-dimensional body model.

Iteratively adjusting at least one of body pose and shape parameters of the parametric deformable three-dimensional body model, until the three-dimensional model is consistent with (i) the at least one image, (ii) the estimated one or more correspondences, and (iii) the segmented body parts may comprise determining the reprojection error between a two-dimensional location and the projection of the corresponding three-dimensional point in the model, and iteratively adjusting at least one of body pose and shape parameters until the reprojection error is less than a selected threshold.

The method may further comprise determining the difference between segments given by projecting the semantically labelled current model estimate into each image and comparing with the segmented image of the person. For example, this could be achieved using soft rasterization.

In some examples the method further comprises determining photometric consistency between images by using a current value of the parameters of the three-dimensional body model to cross-project colour values between pairs of images and obtain an error based on the difference between colour values from two different images of the same model point.

The method may further comprise determining photometric consistency between features derived from the image extracted from the first few layers of a pretrained convolutional neural network. These features may exhibit better invariance to illumination and viewpoint.

In some examples iteratively adjusting at least one of body pose and shape parameters of the parametric deformable three-dimensional body model, until the three-dimensional model is consistent with (i) the at least one image, (ii) the estimated one or more correspondences, and (iii) the segmented body parts comprises obtaining a weighted sum of at least one of correspondence, segment and image consistency objective functions, and minimising the weight sum using a gradient-based nonlinear optimisation method such as gradient descent. It will be understood that in some examples the weight for each of correspondence, segment and image consistency objective functions; may be zero.

In some examples estimating one or more correspondences between the at least one image and the three-dimensional model comprises obtaining a confidence value for each estimated correspondence indicating how confident the system is that the correspondence is correct. The reprojection error for each correspondence may be weighted by the confidence in the detection. A robust loss function can be used.

In some examples the method further comprises determining the two-dimensional chamfer distance between (i) pixel positions with a given semantic label and (ii) projections of the three-dimensional vertices with the same semantic label from the current estimate of the three-dimensional model. This may avoid the need for rasterisation and the subsequent softening to remain differentiable while computing the segmentation error.

In some examples the segmentation errors are weighted so that pixels lying near the boundary of the segments are given higher weight. This may have the effect of encouraging the boundary of the reconstructed model to align well with the boundary of the body in each image, improving accuracy.

In some examples the photometric consistency error is evaluated at each mesh vertex, and differentiable bilinear sampling is used to sample image colours onto mesh vertices, wherein the sampling for each image is restricted to those vertices that are visible for that image.

Estimating one or more correspondences may comprise estimating a correspondence between a plurality of locations in the image and a plurality of features of the parametric deformable three-dimensional body model. The correspondences might be sparse. For example, they could be the 2D positions of a fixed number of joints or they could be landmarks on the face. Alternatively, correspondences might be dense. For example, every pixel lying inside the human body is assigned an estimated correspondence to the 3D body model. This could be represented via estimation of a two-dimensional coordinate in the UV texture space of the model.

In some examples an initial set of shape parameters in the iterative adjustment process are selected based on a reference body shape. For example, the average of the parametric deformable three-dimensional human body model. This may be, for example, the average of all human body shapes.

The method may further comprise instructing a user to assume a selected pose, and wherein an initial set of body pose parameters in the iterative optimisation process are selected to give a body in the same approximate pose that the user was instructed to assume. For example, the user might be instructed to stand in an "A" pose with arms held away from the body pointing down. In which case, the body pose may be initialised with joint rotations that also give a typical "A" pose.

The method may further comprise iteratively adjusting intrinsic and extrinsic camera parameters. Extrinsic parameters may include the "pose" of the camera relative to the human body.

In some examples initial values for the intrinsic camera parameters are obtained by looking up the camera model, based on image meta data associated with the at least one obtained image of the person, in a database.

In some examples initial values for the extrinsic parameters are obtained by solving a perspective-n-point, PnP, problem for each image using the estimated correspondences between the at least one image and the three-dimensional model. The three-dimensional coordinates for the PnP problem may be obtained by the corresponding surface or joint positions on a body model having the initial set of shape and body pose parameters as determined above.

In some examples the method further comprises obtaining accelerometer information associated with each at least one image of the person, and wherein the initial values for the extrinsic parameters are obtained by solving a restricted PnP problem for each image in which the rotation is constrained based on the accelerometer information. For example, rotation may be constrained by the known vertical direction given by the accelerometer.

The method may further comprise obtaining a user-supplied height, and wherein obtaining a parametric deformable three-dimensional body model of a person is based on the obtained user's height such that the parametric deformable three-dimensional body model of a person has a height equal to the input person's height.

In some examples the method comprises obtaining the gender of the user, and wherein obtaining a parametric deformable three-dimensional body model of a person is based on the obtained user's gender.

Iteratively adjusting at least one of body pose and shape parameters of the parametric deformable three-dimensional body model, until the three-dimensional model is consistent with (i) the at least one image, (ii) the estimated one or more correspondences, and (iii) the segmented body parts may comprise using an objective function that is augmented by a term that penalises any difference between the height of the three-dimensional model and the user-supplied height. This may help to resolve a size/distance ambiguity that can reduce the accuracy of the reconstruction.

In some examples a plurality of images of the person are obtained, and the method may comprise iteratively adjusting at least one of body pose and shape parameters of the parametric deformable three-dimensional body model, until the three-dimensional model is consistent with (i) the at least one image, (ii) the estimated one or more correspondences, and (iii) the segmented body parts comprises using an objective function that is augmented by a term that penalises a least one of (a) variation in the body-to-camera translation between images, and (b) variation in the body pose between images. This may exploit the fact that the user rotates in approximately the same spot so we expect their position relative to the camera to remain approximately constant. This may also exploit the fact that the user rotates but maintains approximately the same pose between images.

The method may further comprise iteratively adjusting at least one of body pose and shape parameters of the parametric deformable three-dimensional body model, until the three-dimensional model is consistent with (i) the at least one image, (ii) the estimated one or more correspondences, and (iii) the segmented body parts comprises using an objective function that is augmented by a term that penalises at least one of (a) implausible shapes using a known prior distribution of the shape parameters in the parametric deformable three-dimensional human body model, and (b) implausible body poses.

In another aspect there is provided a computer readable non-transitory storage medium comprising a program for a computer configured to cause a processor to perform the method of the aspect as described above.

DRAWINGS

Embodiments of the disclosure will now be described, by way of example only, with reference to the accompanying drawings, in which:

FIG. 1 shows an example flow chart of an example computer implemented method of obtaining measurements of a person;

FIG. 9 shows a functional schematic flow chart for the process of computing the photo-consistency error between input images using the current estimate of the 3D body model;

FIG. 10 shows a functional schematic view of another application 500 for performing methods of the disclosure such as the method described above with reference to FIG. 3;

SPECIFIC DESCRIPTION

Figure 2:
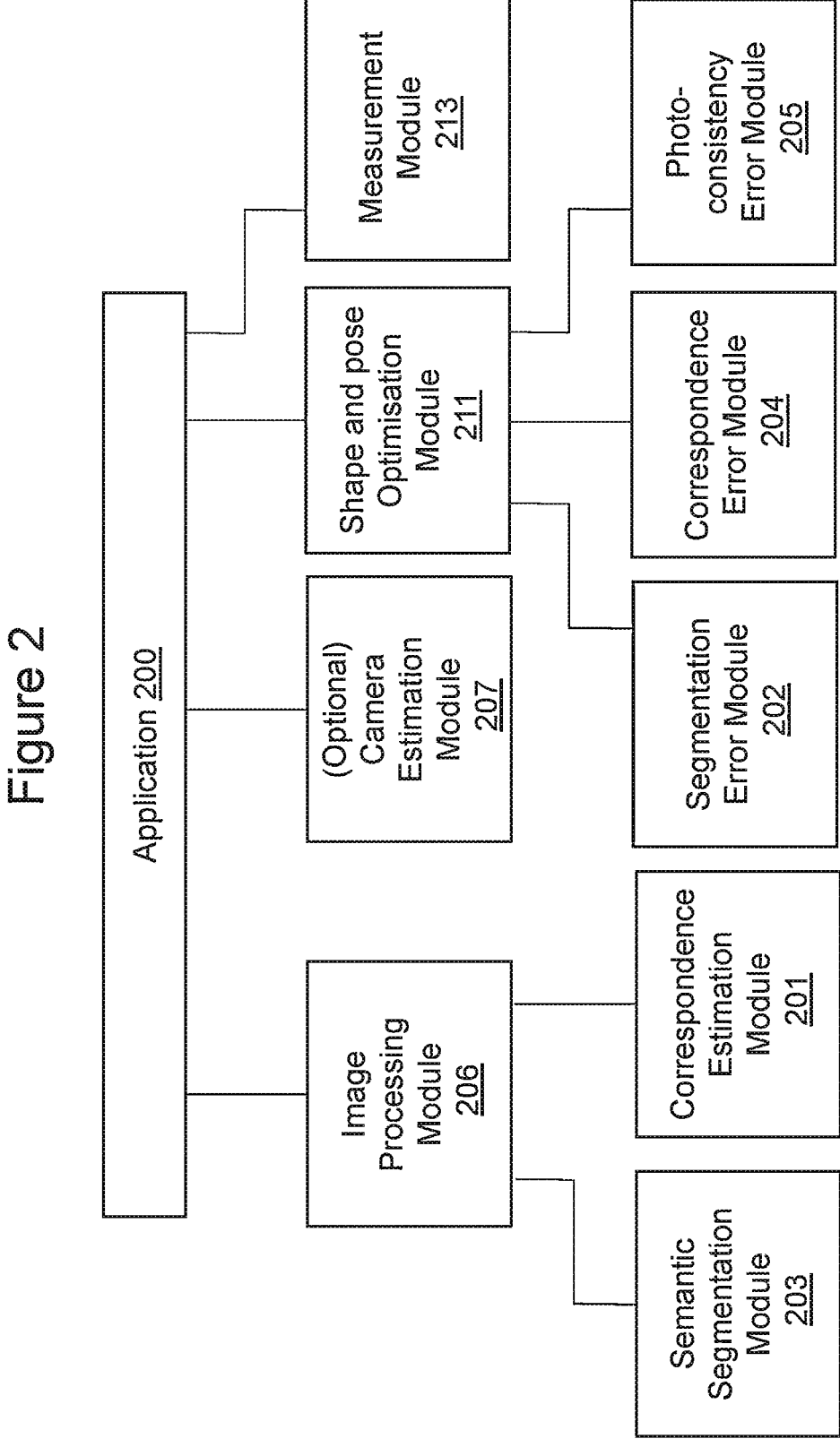
FIG. 2 shows a functional schematic view of an application 200 for performing the method of FIG. 1.

FIG. 1 shows an example flow chart of an example computer implemented method 1000 of obtaining measurements of a person. The method comprises the first steps of obtaining 1010 or constructing a parametric deformable three-dimensional body model that can approximate the shape of any person and obtaining 1020 at least one image of the person. It will be understood that these steps need not be performed in the order shown in FIG. 1 but, for example, the at least one image of the person may be obtained before the parametric deformable three-dimensional body model is obtained. The parametric deformable three-dimensional body model is a generic model that can change body shape and pose to approximate any person in any pose. For example, the parametric deformable three-dimensional human body model may comprise body pose parameters and/or shape parameters. The body shape parameters determine the body shape. For example, some body shape parameters might relate to controlling the height, weight, build and gender of the body. Often the parameters are weights that are used to form a weighted combination of basis shapes (such a model is often referred to a Linear Blendshape Model) and often these basis shapes are learnt from data, for example using Principal Components Analysis. The body pose parameters determine the pose in which the body is configured. For example, pose parameters might control raising or lowering an arm or turning the head side to side. These pose parameters might take the form of rotation matrices attached to each joint of a skeleton model. The specific shape of the person is reconstructed by finding the optimal parameters (shape and/or pose) of this model.

An example of the parametric deformable three-dimensional human body model may be that described in Loper, Matthew, et al. "SMPL: A skinned multi-person linear model." ACM transactions on graphics (TOG) 34.6 (2015): 1-16, the disclosure of which is hereby incorporated by reference in its entirety.

At step 1020 a user may install or uses the application 200 (for example from a retailer website) in their mobile phone. The user may be asked to give their height and weight. The user may then place their mobile phone on a table/ground, against a household object and steps back into image. Following instructions from the app in the phone, images (RGB images) are taken (for example 4 photos/video each from a different angle). These RGB images (augmented with accelerometer measurement), camera information and user profile are uploaded to a "backend" to be processed (e.g. on a remote server/cloud).

The projection of 3D points to 2D images is modelled by a geometric camera projection model. For example, this could be the classical pinhole projection model. This geometric projection process may depend upon intrinsic parameters and extrinsic parameters of the camera used to capture the at least one images. The optimal parameters for this model may also be obtained as part of the reconstruction process. However, this may not be needed if the setup of the camera is pre-calibrated prior to obtaining the at least one image (as discussed below).

Preferably the at least one image is obtained by a user (who is wearing tightly fitting clothing) capturing one or more images (for example using a smartphone) in which their full body is visible. Where more than one image is captured, the user rotates between captures providing different viewpoints of their body.

The method 1000 then comprises the step of estimating 1030 one or more correspondences between the at least one image and the three-dimensional body model. As will be described below with reference to FIG. 2, a correspondence module 201 may estimate one or more correspondences between the image and the three-dimensional model. Each correspondence may consist of a two-dimensional location in the image and an index to either a point on the surface or an internal joint of the three-dimensional body model.

The step of estimating 1030 may optionally comprise providing a confidence value for each estimated correspondence indicating how confident the system is that the correspondence is correct. For example, the confidence value may be determined by the correspondence module 201.

In some examples, correspondences might be sparse. For example, they could be the two-dimensional positions of a fixed number of joints estimated using the method described for example in Cao, Zhe, et al. "OpenPose: realtime multi-person 2D pose estimation using Part Affinity Fields." IEEE transactions on pattern analysis and machine intelligence 43.1 (2019): 172-186, the disclosure of which is hereby incorporated by reference in its entirety, or they could be landmarks on the face estimated using the method described for example in Wang, Xinyao, Liefeng Bo, and Li Fuxin. "Adaptive wing loss for robust face alignment via heatmap regression." Proceedings of the IEEE/CVF International Conference on Computer Vision. 2019, the disclosure of which is hereby incorporated by reference in its entirety.

In some examples, correspondences might be dense. For example, every pixel lying inside the human body may be assigned an estimated correspondence to the three-dimensional body model. This could be represented via estimation of a two-dimensional coordinate in the UV texture space of the model, for example as described in Güler, Riza Alp, Natalia Neverova, and Iasonas Kokkinos. "Densepose: Dense human pose estimation in the wild." Proceedings of the IEEE conference on computer vision and pattern recognition, 2018, the disclosure of which is hereby incorporated by reference in its entirety.

Independently of the step of estimating 1030 one or more correspondences between the at least one image and the three-dimensional body model, for each image, a segmentation module 203 performs 1040 semantic image segmentation to segment the image of the person into their corresponding body parts. For example, each pixel in each image is labelled either as background or as the body part to which it belongs. This could be achieved for example using the method described in Gong, Ke, et al. "Look into person: Self-supervised structure-sensitive learning and a new benchmark for human parsing." Proceedings of the IEEE Conference on Computer Vision and Pattern Recognition, 2017, which is hereby incorporated by reference in its entirety. The human body segmentation can include one or more body part classes. In the case of one class, the image is effectively segmented into a binary silhouette covering the entire body region.

The method 1000 then comprises iteratively adjusting 1050 at least one of (a) body pose and (b) shape parameters of the parametric deformable three-dimensional body model, to improve the fit of the three-dimensional model to at least one of: (i) the at least one image, (ii) the estimated one or more correspondences; and (iii) the segmented body parts. This could be done using a pose optimisation module 209 and a shape optimisation module 211. Preferably at least the fit of the three-dimensional model to the estimated one or more correspondences is adjusted.

The shape parameters in the iterative adjustment process may be initialised by choosing a reference body shape (for example the average of the parametric deformable 3D human body model).

The body pose parameters in the iterative adjustment process may be initialised to give a body in the same approximate pose that the user was instructed to assume (for example, the user might be instructed to stand in an "A" pose with arms held away from the body pointing down—then we initialise the body pose with joint rotations that also give a typical "A" pose).

In some examples, camera parameters are also iteratively adjusted. Intrinsic camera parameters may be initialised by looking up the camera model (as recorded in the image meta data) in a database which stores the corresponding intrinsic calibration results.

Extrinsic parameters (such as the "pose" of the camera relative to the human body) may be initialised by solving a perspective-n-point (PnP) problem for each image using the estimated correspondences obtained above. The three-dimensional coordinates for the PnP problem are given by the corresponding surface or joint positions on the body model as initialised above. The resulting PnP problem may be solved using a method such as that described in Lepetit, Vincent, Francesc Moreno-Noguer, and Pascal Fua. "EPnP: An accurate O (n) solution to the PnP problem." International journal of computer vision 81.2 (2009): 155, the disclosure of which is hereby incorporated by reference in its entirety. The camera poses may alternatively be initialised by solving a restricted PnP problem for each image in which the rotation is constrained by the known vertical direction given by the accelerometer. This could be achieved using the method in Kukelova, Zuzana, Martin Bujnak, and Tomas Pajdla. "Closed-form solutions to minimal absolute pose problems with known vertical direction." Asian Conference on Computer Vision. Springer, Berlin, Heidelberg, 2010, the disclosure of which is hereby incorporated by reference in its entirety.

It will be understood that improving the fit of the three-dimensional model may comprise employing an objective function or loss function, for example to reduce the objective or loss function to as low a value as possible (such that it is optimised).

An objective function to measure consistency with the estimated correspondences may compute the reprojection error between the two-dimensional location and the projection of the corresponding three-dimensional point in the model. For example, iteratively adjusting 1050 at least one of body pose and shape parameters of the parametric deformable three-dimensional body model, until the three-dimensional model is consistent with (ii) the estimated one or more correspondences, may comprise determining the reprojection error between a two-dimensional location and the projection of the corresponding three-dimensional point in the model, and iteratively adjusting at least one of body pose and shape parameters until the reprojection error is less than a selected threshold.

In examples where the step of estimating 1030 comprises providing a confidence value for each estimated correspondence indicating how confident the system is that the correspondence is correct, the reprojection error for each correspondence can be weighted by the confidence in the detection, as supplied by the joint detector, and a robust loss function can be used, for example as described in Bogo, Federica, et al. "Keep it SMPL: Automatic estimation of 3D human pose and shape from a single image." European conference on computer vision. Springer, Cham, 2016, the disclosure of which is hereby incorporated by reference in its entirety.

An objective function to measure consistency with the estimated human body part segments may measure the difference between the segments given by projecting the semantically labelled current model estimate into each image and comparing with the segmentation provided above. For example, this could be achieved using soft rasterisation as described, for example, in Liu, Shichen, et al. "Soft rasterizer: A differentiable renderer for image-based 3d reasoning." Proceedings of the IEEE/CVF International Conference on Computer Vision, 2019, the disclosure of which is hereby incorporated by reference in its entirety. For example, the method 1000 may further comprise determining the difference between segments given by projecting the semantically labelled current model estimate (such as a current value or values of the parameters of the three-dimensional body model) into each image and comparing with the segmented image of the person. In this context, it will be understood that the generic parametric deformable three-dimensional body model may be labelled as a once off process (for example, prior to it being obtained or constructed or, for example, at the time it is obtained or constructed). So, every point on the surface of the model has a semantic label (such as "hand", "forearm" etc). The "current model estimate" means the body shape given by the shape and pose parameters that are being iteratively adjusted. Together, the semantic labels and the shape estimate enable projection of the labels into each two-dimensional image giving a predicted two-dimensional semantic image that can be compared to the one estimated from the original image. Each label may be determined from a set of one or more possible labels.

The segmentation error or the difference between the segments given by projecting the semantically labelled current model estimate into each image and comparing with the segmentation provided above can alternatively be computed as the two-dimensional Chamfer distance between: a. the pixel positions with a given semantic label and b. the projections of the three-dimensional vertices with the same semantic label from the current estimate of the three-dimensional model. This may avoid the need for rasterisation and the subsequent softening to remain differentiable which may be a drawback of the method of Lie, Shichen et al. described above. For the special case of a single semantic label, there is no need to compute vertex visibility to exclude occluded vertices, gaining efficiency. The segmentation errors can be weighted so that pixels lying near the boundary of the segments are given higher weight. This has the effect of encouraging the boundary of the reconstructed model to align well with the boundary of the body in each image, improving accuracy.

An objective function to measure photometric consistency between images may use a current iteration of the model estimate to cross-project colour values between pairs of images. The difference between colour values from two different images of the same model point may provide the error to be minimised, as described for example in Amberg, Brian, et al. "Reconstructing high quality face-surfaces using model based stereo." 2007 IEEE 11th International Conference on Computer Vision, IEEE, 2007, the disclosure of which is hereby incorporated by reference in its entirety. For example, the method 1000 may comprise determining photometric consistency between images by using a current value or values of the parameters of the three-dimensional body model to cross-project colour values between pairs of images and obtain an error based on the difference between colour values from two different images of the same model.

The photometric consistency error (i.e. the difference between colour values from two different images of the same model point) can be evaluated at each mesh vertex and differentiable bilinear sampling used to sample image colours onto mesh vertices. The sampling for each image may be restricted to those vertices that are visible (i.e. not occluded) for that image. In some examples, instead of directly using image colours, consistency can be measured between features derived from the image that exhibit better invariance to illumination and viewpoint. For example, this could be based on features extracted from the first few layers of a pretrained convolutional neural network as in Johnson, Justin, Alexandre Alahi, and Li Fei-Fei. "Perceptual losses for real-time style transfer and super-resolution." European conference on computer vision. Springer, Cham, 2016, the disclosure of which is hereby incorporated by reference in its entirety.

An overall objective function may be used which is a weighted sum of the above three objective functions and may be minimised using a gradient-based nonlinear optimisation method such as gradient descent. Accordingly, iteratively adjusting 1050 at least one of body pose and shape parameters of the parametric deformable three-dimensional body model, until the three-dimensional model is consistent with (i) the at least one image, (ii) the estimated one or more correspondences, and (iii) the segmented body parts may comprise obtaining a weighted sum of at least one of correspondence, segment and image consistency objective functions; and minimising the weight sum using a gradient-based nonlinear optimisation method such as gradient descent.

The method 1000 then comprises extracting 1060 measurements from the iteratively adjusted parametric deformable three-dimensional body model. For example, a measurement module 213 may extract metrically accurate measurements from the reconstructed three-dimensional body model. These may include Euclidean distances between predefined points (such as between the crotch and heel to measure inner leg length) or a predefined closed path on the mesh surface (for example to measure the waist). Predefined points can be specified as vertex indices on the parametric deformable 3D body model. Predefined closed paths can be specified as a sequence of vertices or triangle edges on the parametric deformable 3D body model. The measurements themselves might replicate measurements typically taken by a tailor in order to fabricate clothes of a suitable size.

In some examples, obtaining 1020 at least one image of the person may additionally comprise obtaining meta data comprising, for example, information relating to the camera, and/or an accelerometer measurement for each image such that the direction of gravity is known relative to the camera.

In some examples, in addition to obtaining 1020 at least one image of the person, the user's height may be obtained. For example, the user may be prompted to enter in their height in an app on their smartphone. In such examples, when the shape parameters in the iterative adjustment process are initialised, they are done so such that the height is equal to the obtained height of the user. In some examples iteratively adjusting 1050 at least one of body pose and shape parameters of the parametric deformable three-dimensional body model, until the three-dimensional model is consistent with (i) the at least one image, (ii) the estimated one or more correspondences, and (iii) the segmented body parts comprises using an objective function that is augmented by a term that penalises any difference between the height of the three-dimensional model and the user-supplied height.

In some examples a plurality of images of the person are obtained, and the method 1000 comprises iteratively adjusting 1050 at least one of body pose and shape parameters of the parametric deformable three-dimensional body model, until the three-dimensional model is consistent with (i) the at least one image, (ii) the estimated one or more correspondences, and (iii) the segmented body parts comprises using an objective function that is augmented by a term that penalises a least one of (a) variation in the body-to-camera translation between images, and (b) variation in the body pose between images. This exploits the fact that the user tends to rotate in approximately the same spot, so we expect their position relative to the camera to remain approximately constant. This also exploits the fact that the user tends to rotate but maintain approximately the same pose between images.

In some examples iteratively adjusting 1050 at least one of body pose and shape parameters of the parametric deformable three-dimensional body model, until the three-dimensional model is consistent with (i) the at least one image, (ii) the estimated one or more correspondences, and (iii) the segmented body parts comprises using an objective function that is augmented by a term that penalises at least one of (a) implausible shapes using a known prior distribution of the shape parameters in the parametric deformable three-dimensional human body model, and (b) implausible body poses. This may be done by learning a statistical prior over plausible body poses, for example as described in Pavlakos, Georgios, et al. "Expressive body capture: 3d hands, face, and body from a single image." Proceedings of the IEEE/CVF Conference on Computer Vision and Pattern Recognition, 2019, the disclosure of which is hereby incorporated by reference in its entirety.

FIG. 2 shows a functional schematic view of an application 200 for performing the method of FIG. 1. The application may operate on a remote server (e.g. in the cloud) or may operate on a user's device such as a smartphone. The application 200 comprises a number of modules each configured to perform a particular functionality.

For example, the correspondence module 201 may be configured to perform the step of estimating 1030 one or more correspondences between the at least one image and the three-dimensional model.

The semantic segmentation module 203 may be configured to perform the step of performing 1040 semantic image segmentation to segment the image of the person into their corresponding body parts.

The shape and pose optimisation module 211 may be configured to iteratively adjust 1050 body shape and body pose parameters of the parametric three-dimensional body model.

The (optional) camera estimation module 207 may be configured to obtain camera parameters and/or to iteratively adjust them to improve the fit of the parametric three-dimensional body model.

The measurement module 213 may be configured to extract measurements from the iteratively adjusted parametric deformable three-dimensional body model.

Figure 3:
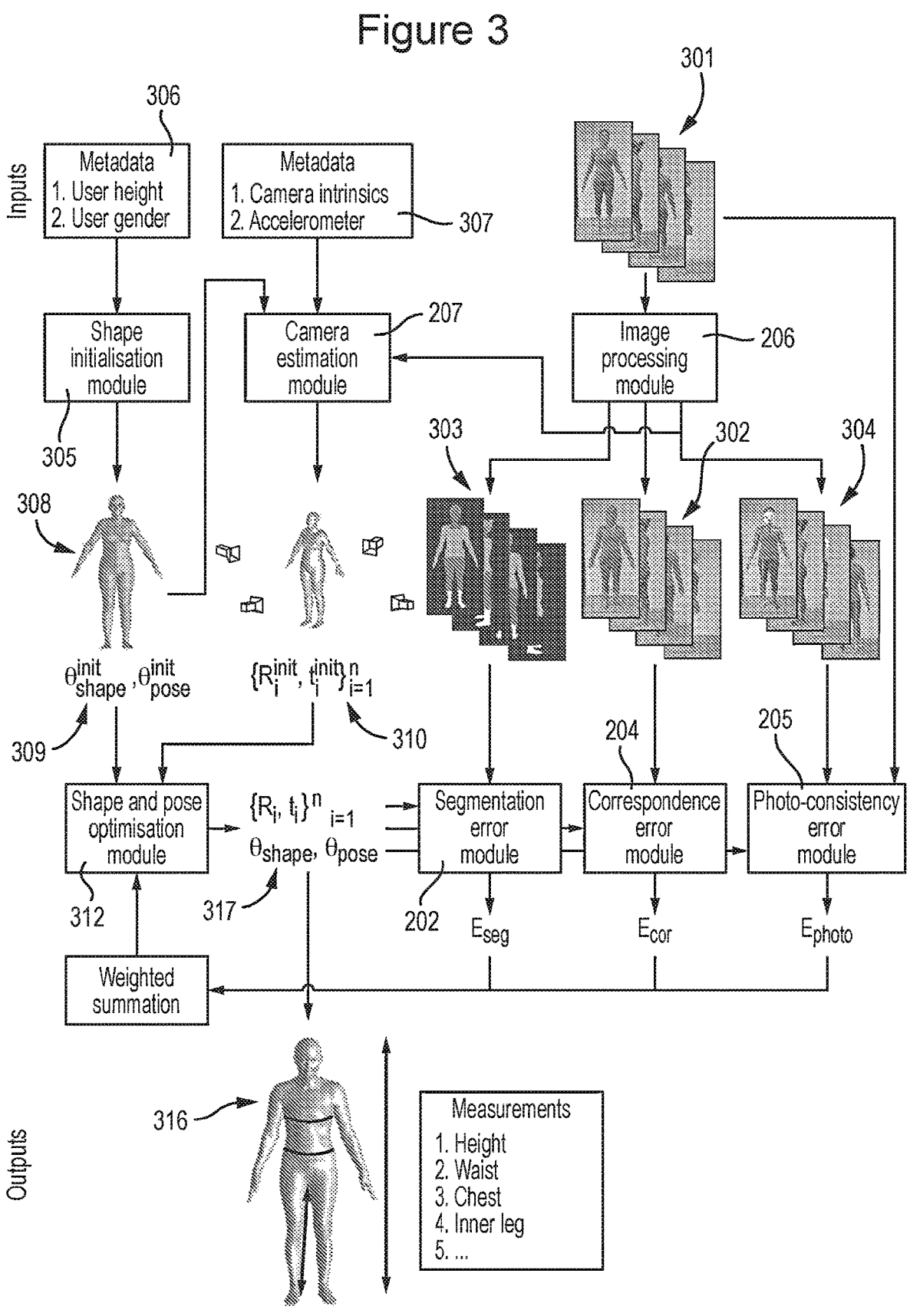
FIG. 3 shows a functional schematic flow chart of the functionality of some of the module of the application 200 described above with reference to FIG. 2, illustrating some of the inputs, outputs and functionality of each of the modules.

FIG. 3 shows a functional schematic flow chart of the functionality of some of the modules of the application 200 described above with reference to FIG. 2, illustrating some of the inputs, outputs and functionality of each of the modules.

As can been seen, at 301 at plurality of images each of different views of a person holding a predefined pose are obtained. These serve as inputs to the image processing module 206. The purpose of the image processing module 206 is to derive intermediate representations of the human body from the input images which are later used by the shape and pose optimisation module 312 to compute a fitting error. Specifically, the image processing module 206 computes a semantic segmentation map 303 for each input image 301 and correspondences 302 304 between each input image 301 and the parametric deformable 3D body model. These correspondences may be sparse joint locations 304 or dense pixel-wise correspondences 302. The semantic segmentation module 203 first extracts the human silhouette in the image and then semantically segments the human body by part i.e. hair, hand, torso etc. An output from this are a series of semantically segmented images of the user's body.

The shape initialisation module 305 produces initial body shape and body parameters 309. These parameters are used with the parametric deformable 3D body model to compute an initial 3D body shape 308. Optionally, these parameters may produce a body shape based on the user's height and gender 306 if these were supplied.

The optional camera estimation module 207 (also shown in more detail in FIG. 4) obtains information from the correspondence estimation module 201 (for example comprising the joint locations in each image), an initial 3D body model 308 (defined in terms of shape and/or pose parameters of the parametric deformable 3D body model) and information relating to the camera 307 such as the camera model and acceleration vectors corresponding to when each image was captured of the plurality of images 301. The camera estimation module 207 uses the detected joint location and the corresponding joints on the reference 3D body shape and may solve a perspective-n-point, PnP, problem to estimate the pose of the camera that captured the plurality of images 301 relative to the body. These initial pose estimates are represented by a rotation matrix and translation vector 310 for each of the n images.

The shape and pose optimisation module 312 iteratively adjusts at least one of the body pose and body shape parameters and optionally the intrinsic and/or extrinsic camera parameters 317. The shape and pose optimisation module 312 adjusts these parameters such that the weighted sum of three error values is reduced. The optimisation process terminates when the error values fall below a predefined threshold. The optimisation process is initialised using the body shape and body pose parameters and camera pose parameters provided by the shape initialisation 305 and camera estimation 207 modules described above. The three error values are computed by the segmentation error module 202 (described below and in FIG. 6 and FIG. 7), the correspondence error module 204 (described below and in FIG. 8) and the photo-consistency error module 205 (described below and in FIG. 9). An output from the shape and pose optimisation module 211 may be an adjusted parametric deformable three-dimensional body model 316 that has the same pose and shape as the user in the plurality of images 301. This adjusted model 316 may then be used to obtain or extract measurements of the person, for example using the measurement module 213.

Figure 4:
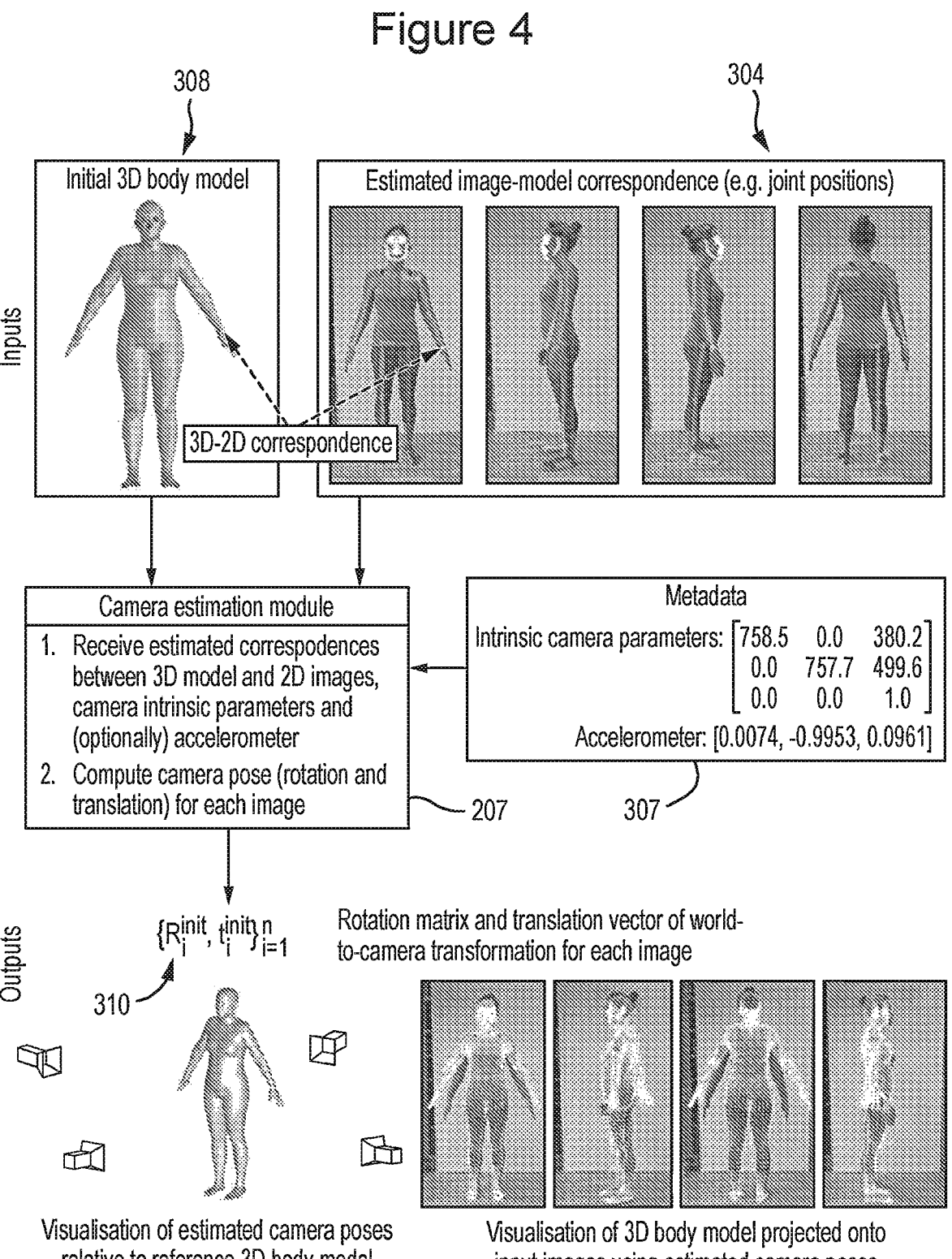
FIG. 4 shows a functional schematic flow chart for the process of camera estimation 209.

FIG. 4 shows a functional schematic flow chart of the camera estimation module 207. This module takes as input an initial 3D body model 308 and estimated correspondences 304 between the parametric deformable 3D body model and the one or more input images. Optionally, the module also receives metadata 307 as input specifying the intrinsic camera parameters and accelerometer recording from the camera used to capture the one or more input images. The module then computes extrinsic camera parameters 310, such as camera pose, for each of the one or more input images. These pose parameters define where the cameras are positioned and how they are oriented relative to the human body. They take the form of a rotation matrix and translation vector that together transform the coordinate system of the parametric deformable 3D body model into coordinate system of the camera. The module provides the extrinsic camera parameters 310 as output.

Figure 5:
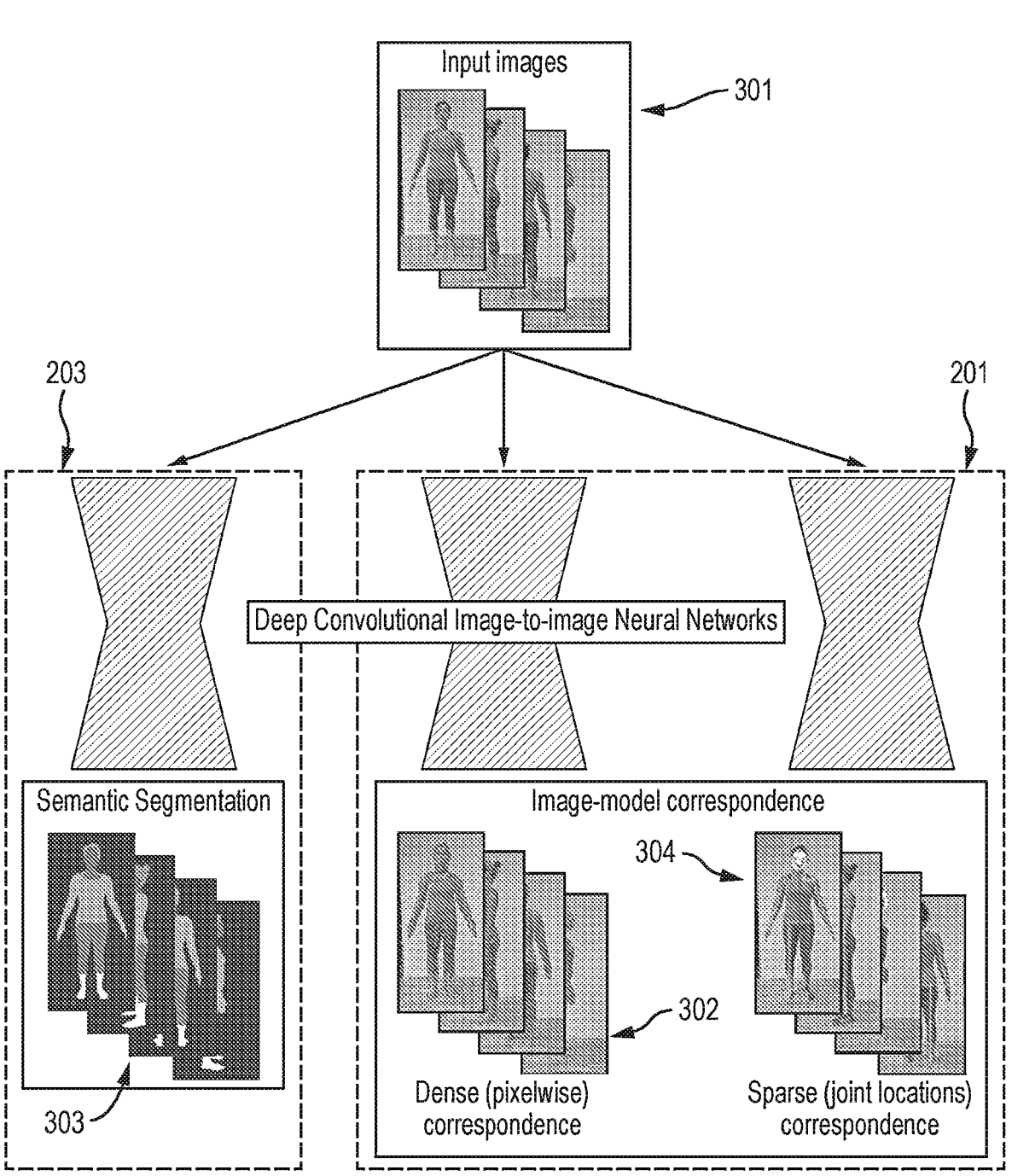
FIG. 5 shows a functional schematic flow chart for the process of deriving semantic segmentation 203 and image-model correspondence 201 from input images using deep convolutional neural networks.

FIG. 5 shows a functional schematic flow chart of the image processing module 206. This comprises three deep neural networks that estimate: 1. A semantic segmentation map 303, 2. Dense pixel-wise image-model correspondence 302, 3. Body joint locations 304. These may be implemented as deep, fully convolutional neural networks, optionally employing skip connections in order to preserve fine detail in the output. The semantic segmentation network may use the softmax operation in order to predict class probabilities for each semantic class. The dense correspondence network may directly regress continuous UV coordinates. The joint network may regress a heat map for each joint location.

Figure 6:
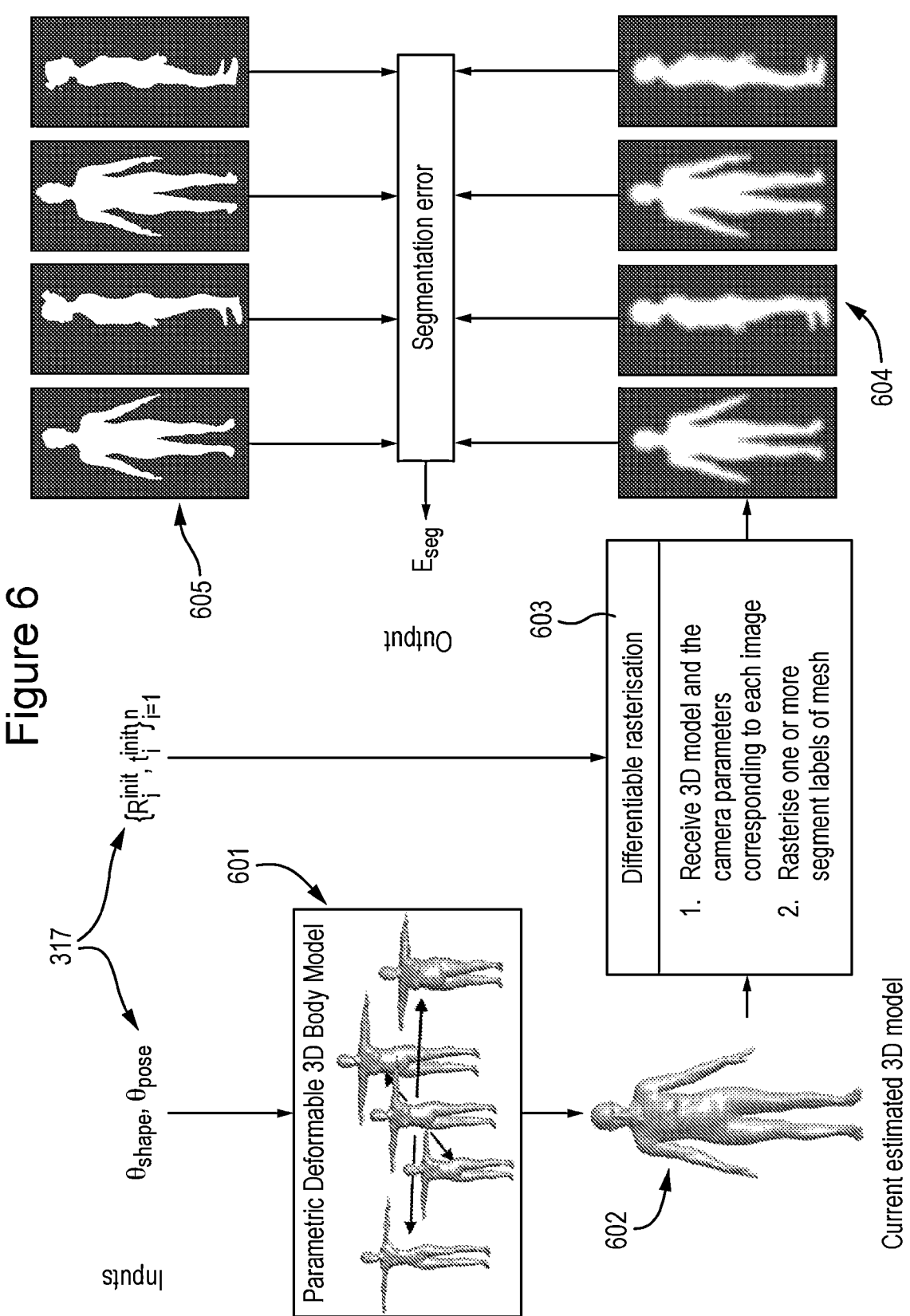
FIG. 6 shows a functional schematic flow chart for the process of computing the segmentation error between the estimated semantic segmentation maps and the current estimate of the 3D body model using soft rasterisation for the case of a single segmentation class.

FIG. 6 shows a functional schematic flow chart of the functionality of the segmentation error module 202. In this example, a single semantic class is used such that the entire silhouette of the parametric deformable 3D body model is used as a single semantic segment. The current estimates of the body pose, body shape and camera parameters 317 are provided as input. The body pose and body shape parameters are used in conjunction with the parametric deformable three-dimensional body model 601 (which may be, for example, a skinned multi-person linear model, SMPL) to produce the current estimate of the 3D body shape and pose of the user 602. This model, along with the camera parameters 317 are provided to a differentiable rasteriser 603 such as Soft Rasteriser that determines which pixels are covered by the projection of the semantic segments on the 3D model into each 2D image. These rasterised segments 604 contain continuous values due to the softening required to make the rasterisation process differentiable. This differs from the binary rasterisation provided by a conventional rasteriser. In contrast, a differentiable rasteriser provides predicted segmentations that are blurred. The rasterised segments 604 are compared to the segmentation 605 provided by the segmentation module 605 to compute a segmentation error. For example, the segmentation error could be the mean squared difference between segmentation values in all pixels across all images.

Figure 7:
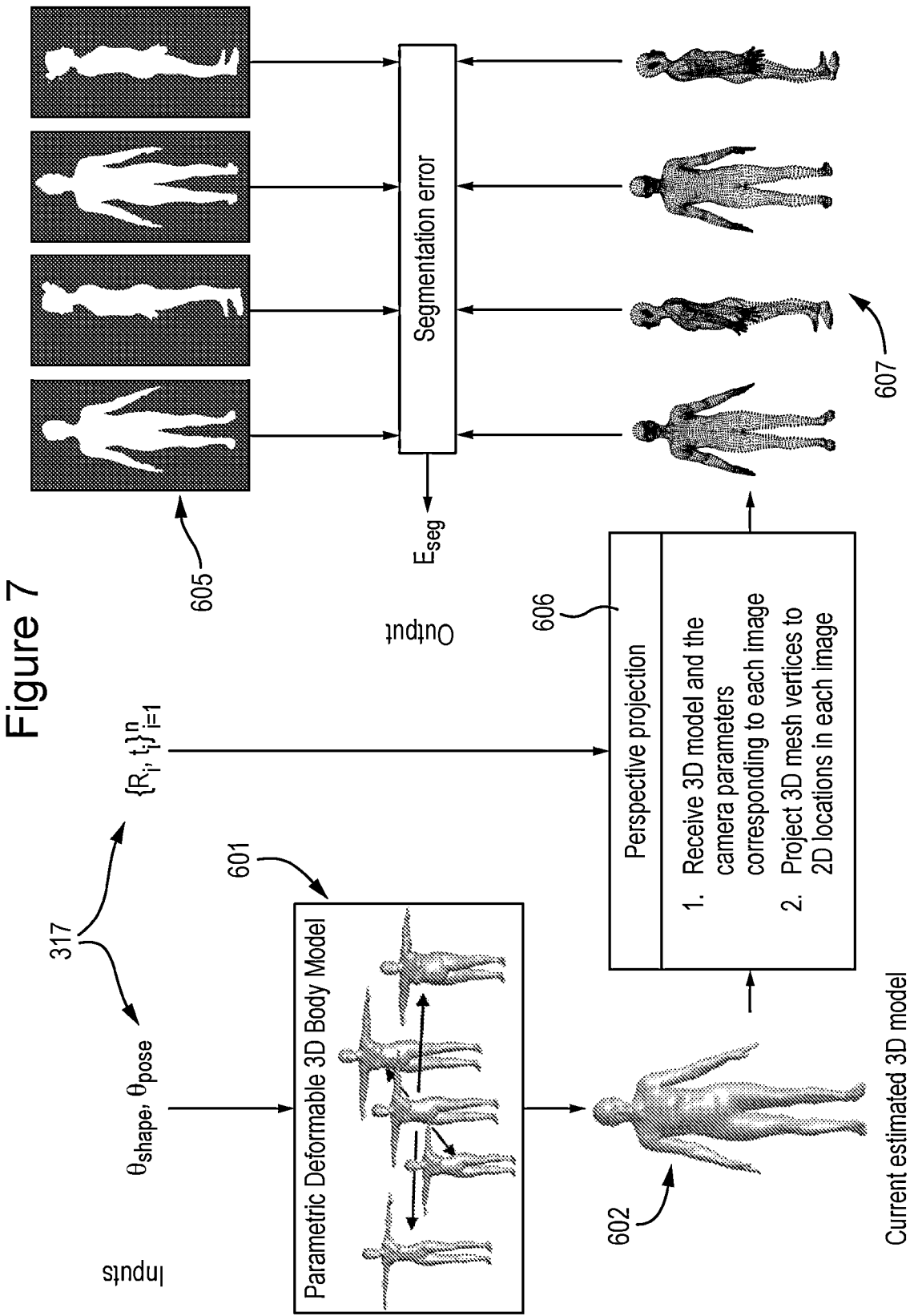
FIG. 7 shows an alternative to FIG. 6 in which segmentation error is computed using the Chamfer distance.

FIG. 7 shows a variation of FIG. 6 which avoids the need for rasterisation. The process is the same as in FIG. 6 but instead of rasterisation, the vertices of the current estimate of the 3D body model are simply projected to 2D 607 by a perspective projection module 606. Then, the segmentation error is computed as the Chamfer distance between the projected vertices 607 and the pixels in the input segmentation 605. This is the sum of all nearest neighbour distances from vertices to pixels and from pixels to vertices. Minimising this error is achieved when the vertices lie exactly over the pixels in the input segmentation.

Figure 8:
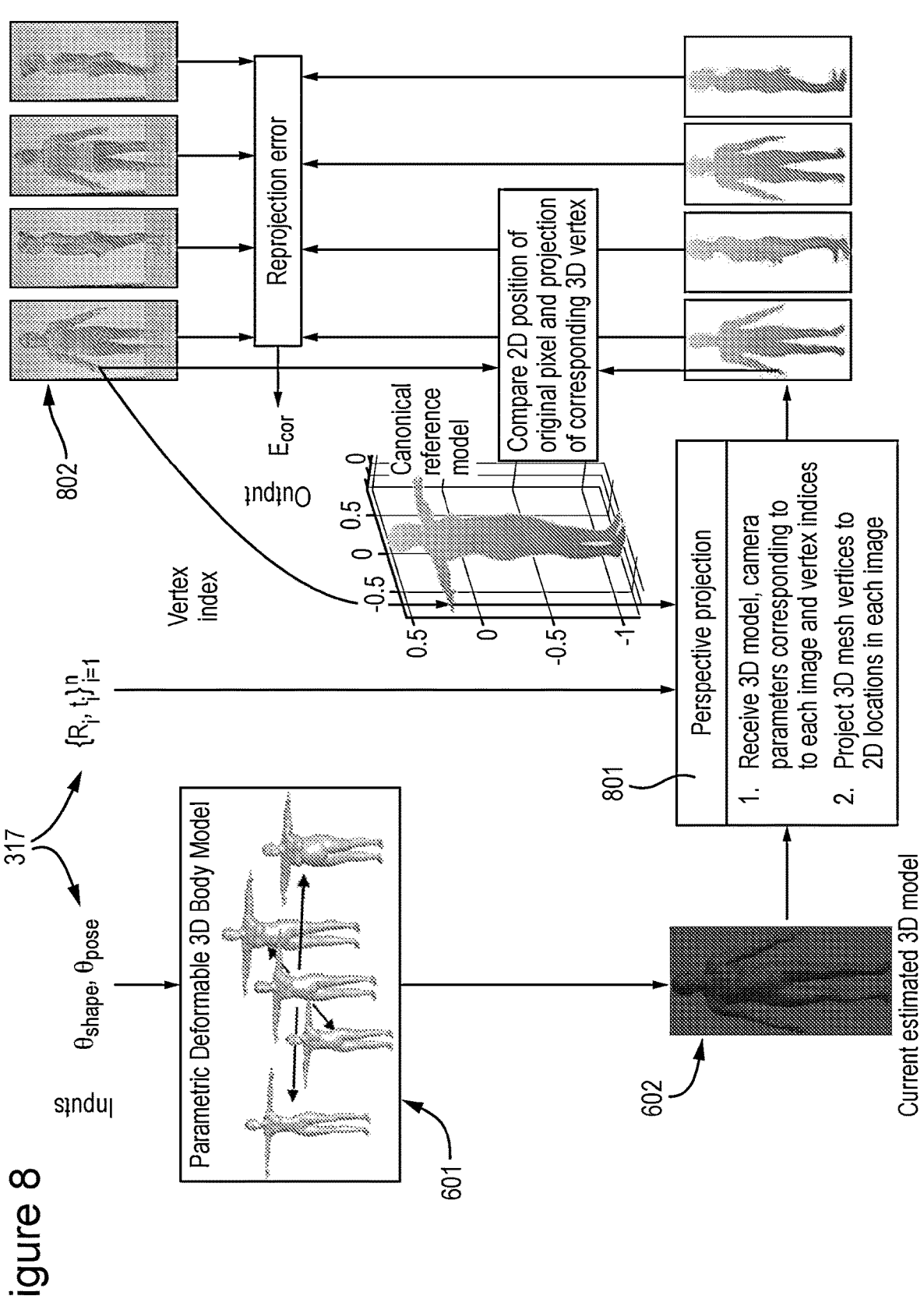
FIG. 8 shows a functional schematic flow chart for the process of computing the correspondence error between the estimated image-model correspondence and the current estimate of the 3D body model.

FIG. 8 shows a functional schematic flow chart of the functionality of the correspondence error module 204. This measures how consistent the current estimate of the 3D body model 602 is with the estimated correspondences for each input image 802. In this example, the correspondence error is shown for an estimated dense correspondence but the process is the same for sparse correspondence such as joint locations. The body pose and body shape parameters 317 are used in conjunction with the parametric deformable three-dimensional body model 601 to produce the current estimate of the 3D body shape and pose of the user 602. This model, along with the camera parameters 317 are provided to a perspective projection module 801 that provides the predicted 2D location of every point on the 3D model. The dense correspondence maps 802 estimated by the correspondence estimation module 201 are provided as input. Every pixel that the correspondence estimation module 201 predicts is covered by body provides an estimated correspondence to a point on the parametric deformable three-dimensional body model. The 2D location of this point, as predicted by the perspective projection module 801, is compared to the original pixel location in order to compute a reprojection error. For example, this could be the Euclidean distance between the original pixel location and the 2D projection of the point predicted to correspond to that pixel. This reprojection error is computed over all body pixels in all input images.

FIG. 9 shows a functional schematic flow chart of the photo-consistency error module 205. This measures how consistent the current estimate of the 3D body model 602 is with the input images 301. The body pose and body shape parameters 317 are used in conjunction with the parametric deformable three-dimensional body model 601 to produce the current estimate of the 3D body shape and pose of the user 602. This model, along with the camera parameters 317 and input images 301 are provided to the differentiable sampling module 901. This module projects the 3D model vertices into each 2D image, determines which vertices are visible (i.e. not occluded) and then interpolates the image colour at each projected location. This leads to a partial per-vertex colour map 902 on the 3D model for each image. Finally, the consistency between these sampled colour maps is measured by computing the difference between colours at the same model vertex in a pair of images. This error is summed over all pairs of vertices that are visible in both views.

Figure 10:
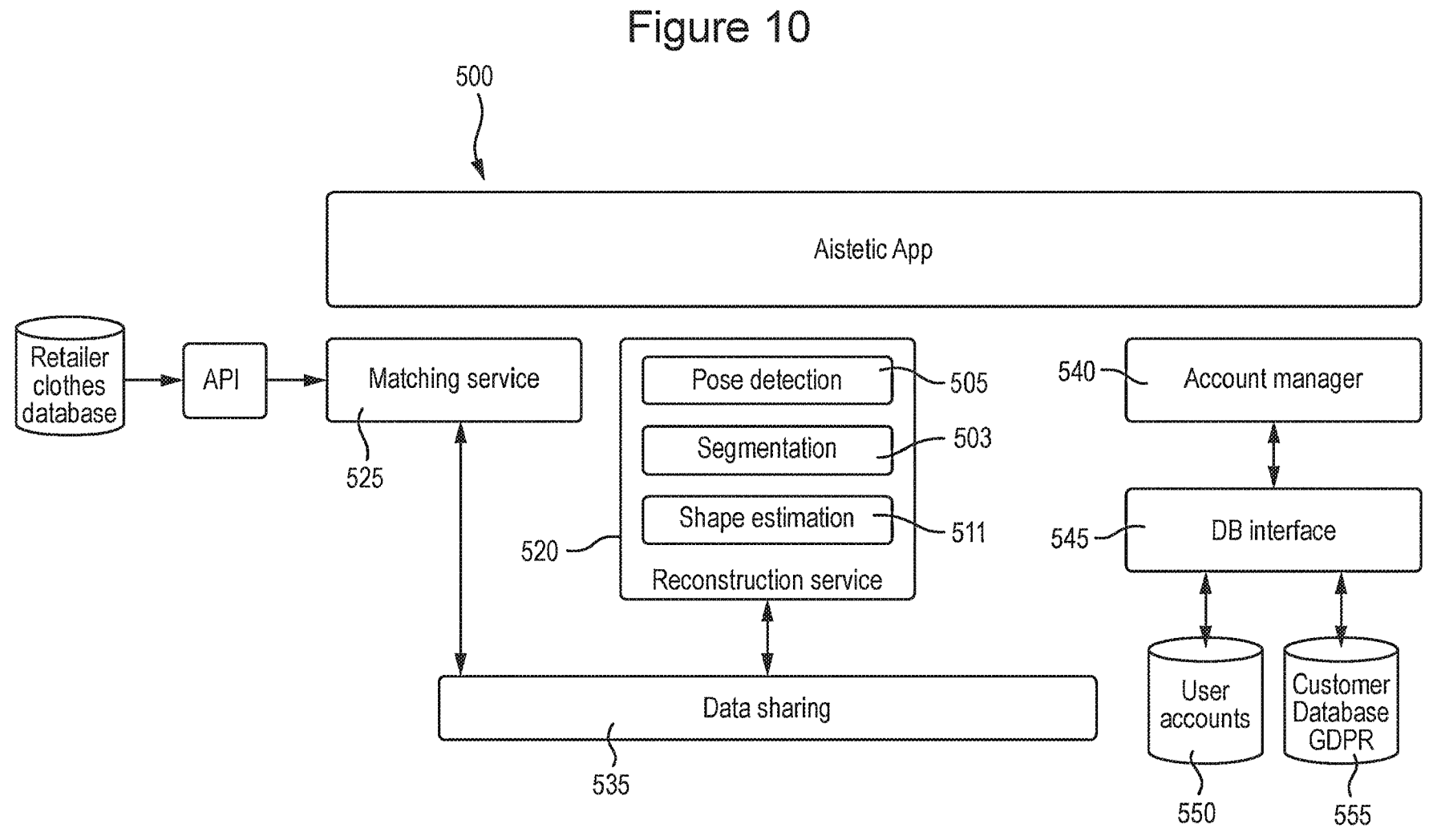

FIG. 10 shows a functional schematic view of another application 500 for performing methods of the disclosure such as the method described above with reference to FIG. 3. The application 500 may operate on a remote server (e.g. in the cloud) or may operate on a user's device such as a smartphone. The application 500 comprises a plurality of modules each configured to perform a particular functionality. These modules may have a similar or identical functionality to the modules described above with respect to FIG. 2, and like reference numerals indicate modules with a similar or identical functionality.

As can be seen, in FIG. 10 the application 500 comprises a plurality of different modules. There is a reconstruction service module 520 that comprises a plurality of sub-modules: a pose detection module 505, a segmentation module 503 and a shape estimation module 511. It will, however, be understood that the reconstruction service module 520 may comprise additional or alternative sub-modules, such as a camera estimation module, a pose and shape optimisation module, a measurement module and a correspondence module as described above with respect to the example of FIG. 2.

There is also a matching service module 525. The matching service module 525 and the reconstruction service module 520 all interact via a data sharing module 535.

The application 500 also comprises an account manager module 540 that communicates with a database interface module 545 that is operable to communicate with user accounts 550 and a customer database 555.

Figure 11:
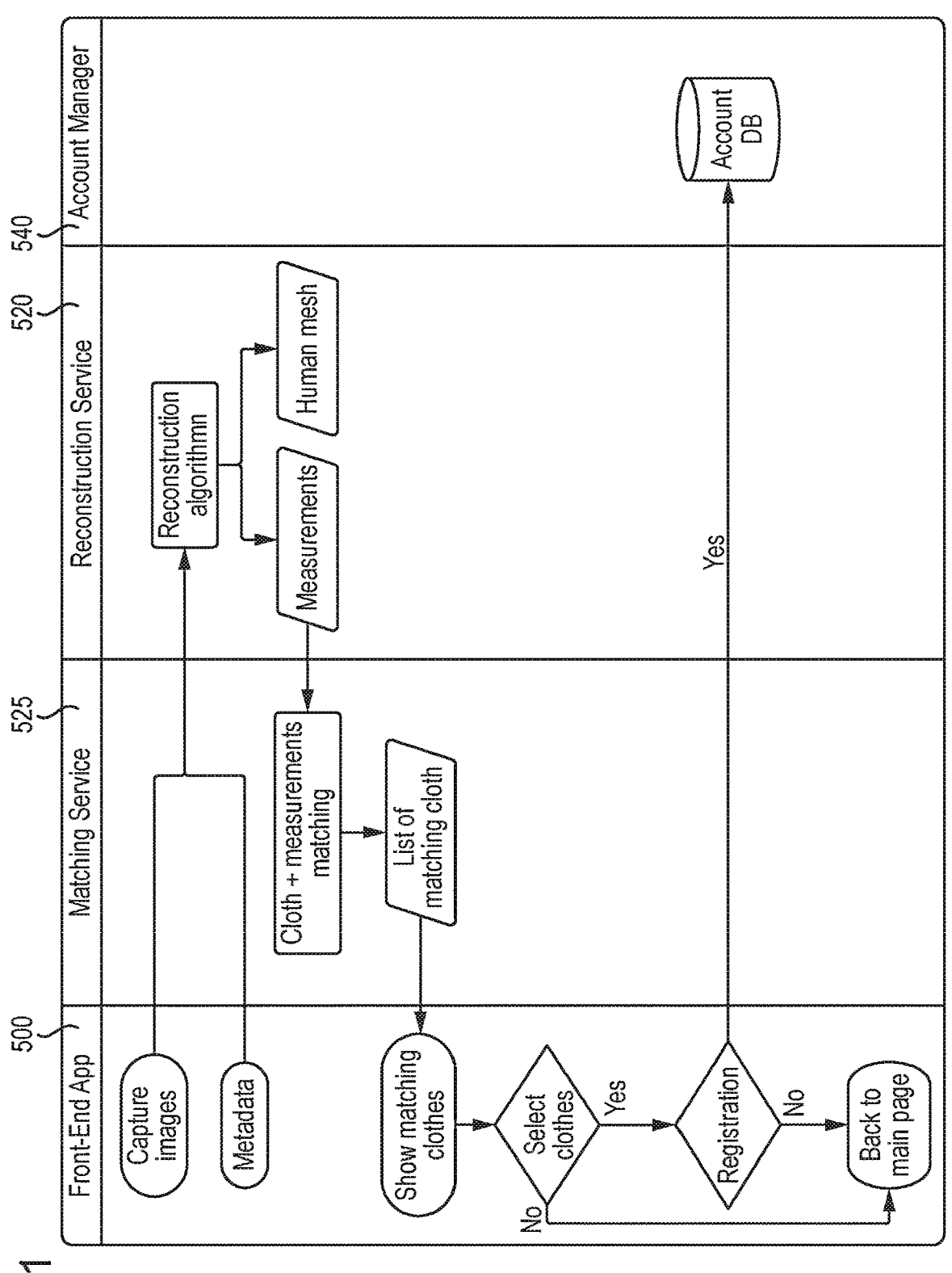
FIG. 11 shows a functional schematic flow chart showing the inputs and outputs of each of the modules shown in FIG. 2 and how it works to implement the method of FIG. 3.

FIG. 11 is a functional schematic flow chart showing the inputs and outputs of each of the modules shown in FIG. 10 and how it works to implement the method of FIG. 3.

As can be seen in FIG. 11, the frond-end app 500 (which may comprise a user interface) captures at least one image of the user along with metadata. The image and metadata are sent from the front-end app 500 to the reconstruction service module 520 where they are processed (using the pose detection 505, segmentation 503 and shape estimation 511 modules) to obtain measurement information and a human mesh (for example a human body model). For example, the reconstruction service module 520 may perform steps 403, 405 and 407 described above. The measurement information is fed to the matching service module 525 where it may perform a search of a retailer's garment database for clothing that corresponds to sizes and references of the person, which may then provide information to the front-end app 500 where available matching clothes are displayed to a user, and the user can select which clothes they wish to visualize. Optionally the front-end app 500 may then interact with the account manager module 540 and save information in a database such as the user account 500 and/or the customer database 555 via operation of database interface module 545.

As used herein, the term "image" means a reproduction or imitation of the form of a person or thing, i.e., a subject. For example, the term image would include any optical counterpart of an object produced by an optical device (such as a lens) or an electronic device (such as a digital camera). The term "image" should also be read to include any visual representation of something, e.g, a likeness of an object produced on a photographic material or a picture produced on an electronic display (such as a television or computer screen). Further, it should be understood that "an image" could include multiple images, for example, a sequence of images that can be taken together to form a video.

The sorts of measurements extracted from the estimate 3D body model might include measurements of the Neck, Chest, Waist, Hip, Back Width, Front Width, Shoulder to Shoulder distance, Arm Hole, Arm Length, Bust, Elbow and Wrist circumference, Back Length (Neck to Waist), Front Length (Neck to Waist), Waist to Hip, Crotch Depth, Thigh Width, Knee Width, Calf Width, Ankle Width, Inseam/ Inside Leg, Outer Seam (waist to floor), Waist to Knee and Height.

Besides extraction of measurements, the estimated 3D body shape model itself has many other potential uses. It could be used as an avatar in a game environment or virtual video conferencing system. It could be used to visualise the draping or fitting of clothes onto the body. It could be used for ergonomics to select or design the best fitting apparel or personal protective equipment. It could be used for photo-realistic synthesis of the body in new environments such as in augmented reality or via insertion into an image. It could be used for medical applications such as surgical planning for cosmetic or reconstructive surgery or to measure obesity or weight loss.

Figure 12:
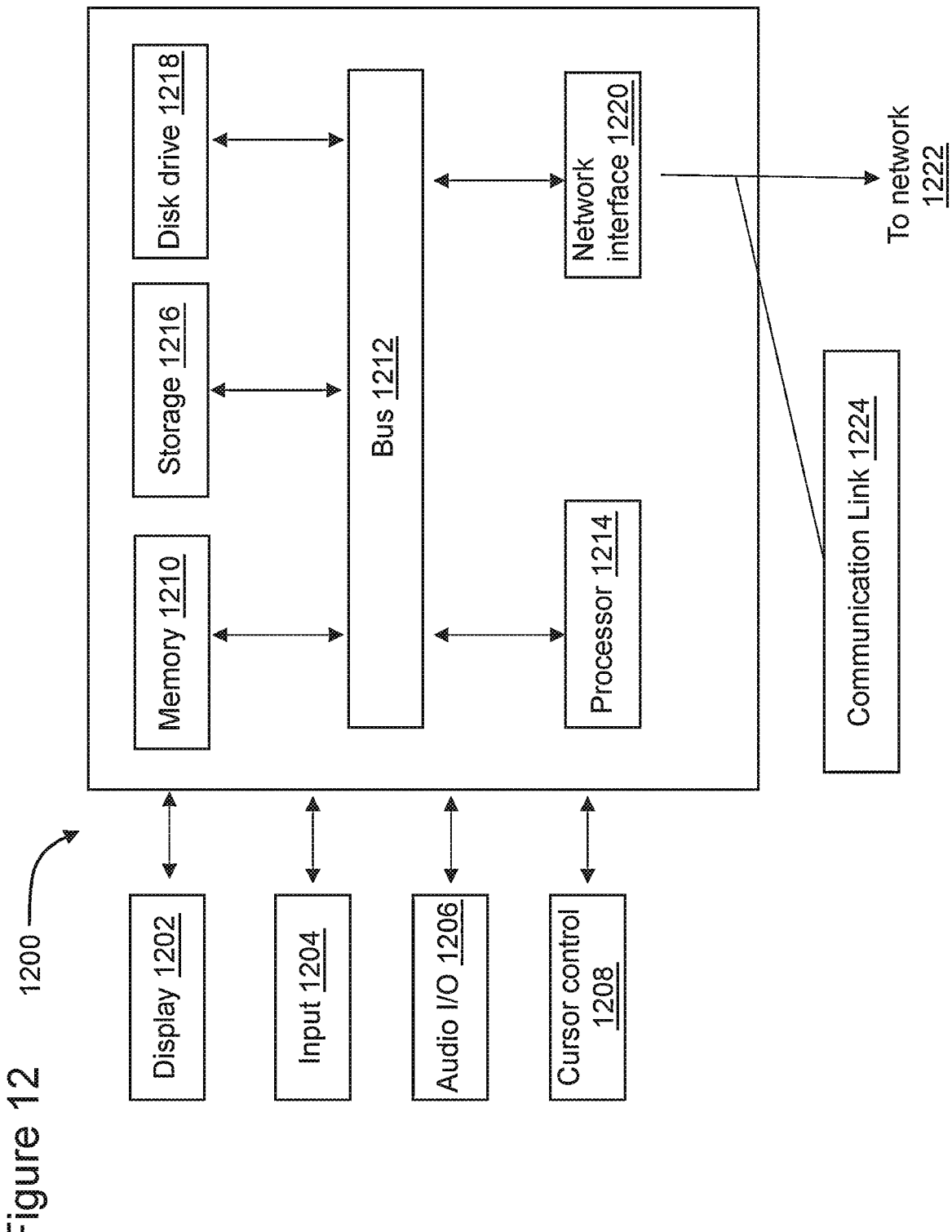
FIG. 12 shows a functional block diagram of a computer system suitable for implementing one or more embodiments of the present disclosure.

FIG. 12 is a block diagram of a computer system 1200 suitable for implementing one or more embodiments of the present disclosure, including the application 200 described above with reference to FIG. 2 and the application 500 described above with reference to FIG. 10.

The computer system 1200 includes a bus 1212 or other communication mechanism for communicating information data, signals, and information between various components of the computer system 1200. The components include an input/output (I/O) component 1204 that processes a user (i.e., sender, recipient, service provider) action, such as selecting keys from a keypad/keyboard, selecting one or more buttons or links, etc., and sends a corresponding signal to the bus 1212. It may also include a camera for obtaining image data. The I/O component 1204 may also include an output component, such as a display 1202 and a cursor control 1208 (such as a keyboard, keypad, mouse, etc.). The display 1202 may be configured to present a login page for logging into a user account or a checkout page for purchasing an item from a merchant. An optional audio input/output component 1206 may also be included to allow a user to use voice for inputting information by converting audio signals. The audio I/O component 1206 may allow the user to hear audio. A transceiver or network interface 1220 transmits and receives signals between the computer system 1200 and other devices, such as another user device, a merchant server, or a service provider server via network 1222. In one embodiment, the transmission is wireless, although other transmission mediums and methods may also be suitable. A processor 1214, which can be a micro-controller, digital signal processor (DSP), or other processing component, processes these various signals, such as for display on the computer system 1200 or transmission to other devices via a communication link 1224. The processor 1214 may also control transmission of information, such as cookies or IP addresses, to other devices.

The components of the computer system 1200 also include a system memory component 1210 (e.g., RAM), a static storage component 1216 (e.g., ROM), and/or a disk drive 1218 (e.g., a solid-state drive, a hard drive). The computer system 1200 performs specific operations by the processor 1214 and other components by executing one or more sequences of instructions contained in the system memory component 1210. For example, the processor 1214 can run the applications 200, 500 described above.

It will also be understood that the modules may be implemented in software or hardware, for example as dedicated circuitry. For example, the modules may be implemented as part of a computer system. The computer system may include a bus or other communication mechanism for communicating information data, signals, and information between various components of the computer system. The components may include an input/output (I/O) component that processes a user (i.e., sender, recipient, service provider) action, such as selecting keys from a keypad/keyboard, selecting one or more buttons or links, etc., and sends a corresponding signal to the bus. The I/O component may also include an output component, such as a display and a cursor control (such as a keyboard, keypad, mouse, etc.). A transceiver or network interface may transmit and receive signals between the computer system and other devices, such as another user device, a merchant server, or a service provider server via a network. In one embodiment, the transmission is wireless, although other transmission mediums and methods may also be suitable. A processor, which can be a micro-controller, digital signal processor (DSP), or other processing component, processes these various signals, such as for display on the computer system or transmission to other devices via a communication link. The processor may also control transmission of information, such as cookies or IP addresses, to other devices.

The components of the computer system may also include a system memory component (e.g., RAM), a static storage component (e.g., ROM), and/or a disk drive (e.g., a solid-state drive, a hard drive). The computer system performs specific operations by the processor and other components by executing one or more sequences of instructions contained in the system memory component.

Logic may be encoded in a computer readable medium, which may refer to any medium that participates in providing instructions to a processor for execution. Such a medium may take many forms, including but not limited to, non-volatile media, volatile media, and transmission media. In various implementations, non-volatile media includes optical or magnetic disks, volatile media includes dynamic memory, such as a system memory component, and transmission media includes coaxial cables, copper wire, and fibre optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by a computer system. In various other embodiments of the present disclosure, a plurality of computer systems 600 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

It will also be understood that aspects of the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

In the context of the present disclosure other examples and variations of the apparatus and methods described herein will be apparent to a person of skill in the art.

The invention claimed is:

1. A computer implemented method of obtaining measurements of a person, the method comprising: obtaining a parametric deformable three-dimensional body model that can approximate a shape of any person; obtaining at least one image of the person; estimating one or more correspondences between the at least one image and the parametric deformable three-dimensional body model; performing semantic image segmentation to segment the at least one image of the person into their corresponding body parts; iteratively adjusting at least one of (a) body pose and (b) shape parameters of the parametric deformable three-dimensional body model, to improve a fit of the parametric deformable three-dimensional body model to at least one of: (i) the at least one image, (ii) the estimated one or more correspondences; and (iii) the segmented body parts; and extracting measurements from the iteratively adjusted parametric deformable three-dimensional body model; wherein iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises: determining a reprojection error between a two-dimensional location and a projection of a corresponding three-dimensional point in the parametric deformable three-dimensional body model; and iteratively adjusting at least one of body pose and shape parameters until the reprojection error is less than a selected threshold; wherein the method further comprises determining a difference between segments given by projecting a semantically labelled current model estimate into each image and comparing with the segmented image of the person; wherein the method further comprises determining a two-dimensional chamfer distance between (i) pixel positions with a given semantic label and (ii) projections of three-dimensional vertices with a same semantic label from a current estimate of the parametric deformable three-dimensional body model, and wherein segmentation errors are weighted so that pixels lying near a boundary of the segments are given higher weight.

2. The method of claim 1, wherein estimating one or more correspondences between the at least one image and the parametric deformable three-dimensional body model comprises obtaining a correspondence between a two-dimensional location in the at least one image and an index to either (i) a point on a surface or (ii) an internal joint of the parametric deformable three-dimensional body model.

3. The method of claim 1, further comprising determining photometric consistency between images by using a current value of the parameters of the parametric deformable three-dimensional body model to cross-project colour values between pairs of images and obtain an error based on a difference between colour values from two different images of a same model.

4. The method of claim 3, wherein the photometric consistency error is evaluated at each mesh vertex, and differentiable bilinear sampling is used to sample image colours onto mesh vertices, wherein the sampling for each image is restricted to those vertices that are visible for that image.

5. The method of claim 1, further comprising determining photometric consistency between features derived from the at least one image extracted from a first few layers of a pretrained convolutional neural network.

6. The method of claim 1, wherein iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises:
    obtaining a weighted sum of at least one of correspondence, segment and image consistency objective functions; and
    minimising the weighted sum using a gradient-based nonlinear optimisation method.

7. The method of claim 1, wherein estimating one or more correspondences between the at least one image and the parametric deformable three-dimensional body model comprises obtaining a confidence value for each estimated correspondence indicating how confident a system is that the correspondence is correct, wherein the reprojection error for each correspondence is weighted by a confidence in a detection.

8. The method of claim 1, wherein estimating one or more correspondences comprises estimating a correspondence between a plurality of locations in the at least one image and a plurality of features of the parametric deformable three-dimensional body model.

9. The method of claim 1, further comprising instructing a user to assume a selected pose, and wherein an initial set of body pose parameters in an iterative optimisation process are selected to give a body in a same approximate pose that the user was instructed to assume.

10. The method of claim 1, further comprising iteratively adjusting intrinsic and extrinsic camera parameters, wherein initial values for the intrinsic camera parameters are obtained by looking up a camera model, based on image meta data associated with the at least one image of the person, in a database, and wherein initial values for the extrinsic camera parameters are obtained by solving a perspective-n-point, PnP, problem for each image using the estimated correspondences between the at least one image and the parametric deformable three-dimensional body model, and wherein three-dimensional coordinates for the PnP problem are obtained by a corresponding surface or joint positions on a body model having an initial set of shape parameters as determined based on a reference body shape and body pose parameters selected to give a body in a same approximate pose that a user was instructed to assume, further comprising obtaining accelerometer information associated with each at least one image of the person, and wherein the initial values for the extrinsic parameters are obtained by solving a restricted PnP problem for each image in which a rotation is constrained based on the accelerometer information.

11. The method of claim 1, wherein the method further comprises obtaining a user-supplied height, and wherein obtaining a parametric deformable three-dimensional body model of a person is based on the obtained user-supplied height such that the parametric deformable three-dimensional body model of a person has a height equal to the obtained user-supplied height.

12. The method of claim 11, wherein iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises using an objective function that is augmented by a term that penalises any difference between the height of the parametric deformable three-dimensional body model and the user-supplied height.

13. The method of claim 1, wherein a plurality of images of the person are obtained, and the method comprises iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises using an objective function that is augmented by a term that penalises a least one of (a) variation in a body-to-camera translation between images, and (b) variation in the body pose between images.

14. The method of claim 1, wherein the method comprises iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises using an objective function that is augmented by a term that penalises at least one of (a) implausible shapes using a known prior distribution of the shape parameters in the parametric deformable three-dimensional body model, and (b) implausible body poses.

15. A computer readable non-transitory storage medium comprising a program for a computer configured to cause a processor to perform a method of obtaining measurements of a person, the method comprising: obtaining a parametric deformable three-dimensional body model that can approximate a shape of any person; obtaining at least one image of the person; estimating one or more correspondences between the at least one image and the parametric deformable three-dimensional body model; performing semantic image segmentation to segment the at least one image of the person into their corresponding body parts; iteratively adjusting at least one of (a) body pose and (b) shape parameters of the parametric deformable three-dimensional body model, to improve a fit of the parametric deformable three-dimensional body model to at least one of: (i) the at least one image, (ii) the estimated one or more correspondences; and (iii) the segmented body parts; and extracting measurements from the iteratively adjusted parametric deformable three-dimensional body model; wherein iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises: determining a reprojection error between a two-dimensional location and a projection of a corresponding three-dimensional point in the parametric deformable three-dimensional body model; and iteratively adjusting at least one of body pose and shape parameters until the reprojection error is less than a selected threshold; wherein the method further comprises determining a difference between segments given by projecting a semantically labelled current model estimate into each image and comparing with the segmented image of the person; wherein the method further comprises determining a two-dimensional chamfer distance between (i) pixel positions with a given semantic label and (ii) projections of three-dimensional vertices with a same semantic label from a current estimate of the parametric deformable three-dimensional body model, and wherein segmentation errors are weighted so that pixels lying near a boundary of the segments are given higher weight.

16. A system comprising: a processor; and a computer readable non-transitory storage medium comprising a program for a computer configured to cause the processor to perform a method of obtaining measurements of a person, the method comprising: obtaining a parametric deformable three-dimensional body model that can approximate a shape of any person; obtaining at least one image of the person; estimating one or more correspondences between the at least one image and the parametric deformable three-dimensional body model; performing semantic image segmentation to segment the at least one image of the person into their corresponding body parts; iteratively adjusting at least one of (a) body pose and (b) shape parameters of the parametric deformable three-dimensional body model, to improve a fit of the parametric deformable three-dimensional body model to at least one of: (i) the at least one image, (ii) the estimated one or more correspondences; and (iii) the segmented body parts; and extracting measurements from the iteratively adjusted parametric deformable three-dimensional body model; wherein iteratively adjusting at least one of body pose and shape parameters of the parametric deformable three-dimensional body model, until the parametric deformable three-dimensional body model is consistent with (i) the at least one image, (ii) the estimated one or more correspondences, and (iii) the segmented body parts comprises: determining a reprojection error between a two-dimensional location and a projection of a corresponding three-dimensional point in the parametric deformable three-dimensional body model; and iteratively adjusting at least one of body pose and shape parameters until the reprojection error is less than a selected threshold; wherein the method further comprises determining a difference between segments given by projecting a semantically labelled current model estimate into each image and comparing with the segmented image of the person; wherein the method further comprises determining a two-dimensional chamfer distance between (i) pixel positions with a given semantic label and (ii) projections of three-dimensional vertices with a same semantic label from a current estimate of the parametric deformable three-dimensional body model, and wherein segmentation errors are weighted so that pixels lying near a boundary of the segments are given higher weight.

* * * * *